(12) United States Patent
Dessaint Jean (10) Patent No.: US 10,072,717 B2
(45) Date of Patent: Sep. 11, 2018

(54) DRIVEN WHEEL ASSEMBLY AND AUTOMOTIVE VEHICLE EQUIPPED WITH SUCH AN ASSEMBLY

(71) Applicant: VOLVO TRUCK CORPORATION, Göteborg (SE)

(72) Inventor: Nicolas Dessaint Jean, Bessenay (FR)

(73) Assignee: Volvo Truck Corporation, Göteborg (SE)

( * ) Notice: Subject to any disclaimer, the term of this patent is extended or adjusted under 35 U.S.C. 154(b) by 64 days.

(21) Appl. No.: 15/021,712

(22) PCT Filed: Oct. 8, 2013

(86) PCT No.: PCT/IB2013/002811
§ 371 (c)(1),
(2) Date: Mar. 14, 2016

(87) PCT Pub. No.: WO2015/052553
PCT Pub. Date: Apr. 16, 2015

(65) Prior Publication Data
US 2016/0223039 A1   Aug. 4, 2016

(51) Int. Cl.
*F16D 65/12* (2006.01)
*B60B 27/00* (2006.01)
(Continued)

(52) U.S. Cl.
CPC .......... *F16D 65/123* (2013.01); *B60B 27/001* (2013.01); *B60B 27/0021* (2013.01);
(Continued)

(58) Field of Classification Search
CPC ............. F16D 65/123; F16D 2065/136; F16D 2065/1384; F16D 2065/1392;
(Continued)

(56) References Cited

U.S. PATENT DOCUMENTS 1,685,429 A * 9/1928 Masury ................. B60T 11/043
188/18 R
1,973,837 A * 9/1934 Youngren ........... B60B 27/0005
180/379

(Continued)

FOREIGN PATENT DOCUMENTS

DE    37 21 737 A1    1/1989
DE    43 36 617 C1    3/1995
(Continued)

OTHER PUBLICATIONS

International Search Report (dated Jul. 2, 2014) for corresponding International App. PCT/IB2013/002811.

*Primary Examiner* — Samuel J Morano, IV
*Assistant Examiner* — Jean W Charleston
(74) *Attorney, Agent, or Firm* — WRB-IP LLP (57) ABSTRACT

A driven wheel assembly includes a fixed axle spindle, a rotating drive shaft extending inside the axle spindle, a bearing, a hub, a brake disc, and a wheel rim. An inner ring of the bearing is mounted on the spindle. The hub is mounted on an outer ring of the bearing. The drive shaft, the brake disc and the wheel rim are coupled in rotation with the hub. The brake disc includes a radial friction part and a tubular portion which is fastened to the hub. The brake disc is fastened to the hub by a radial fastener extending along radial directions with respect to a rotation axis of the assembly and mounted through the tubular portion of the brake disc.

16 Claims, 6 Drawing Sheets

(51) Int. Cl.
  *B60B 27/02* (2006.01)
  *B60B 35/12* (2006.01)
  *B60B 35/18* (2006.01)
  *F16C 35/063* (2006.01)
  *B60B 27/06* (2006.01)
  *F16D 65/02* (2006.01)
  *F16C 19/38* (2006.01)

(52) U.S. Cl.
  CPC ............ *B60B 27/02* (2013.01); *B60B 27/065* (2013.01); *B60B 35/121* (2013.01); *B60B 35/18* (2013.01); *F16C 35/063* (2013.01); *F16C 19/386* (2013.01); *F16C 2326/02* (2013.01); *F16D 2065/136* (2013.01); *F16D 2065/1384* (2013.01); *F16D 2065/1392* (2013.01)

(58) Field of Classification Search
  CPC ... B60B 27/001; B60B 27/0021; B60B 27/02; B60B 27/065; B60B 35/121; B60B 35/18; F16C 35/063; F16C 19/386
  USPC ....... 301/6.1, 6.6, 6.8, 124.1, 105.1; 188/17, 188/18 A, 26, 218 XL
  See application file for complete search history.

(56) References Cited

U.S. PATENT DOCUMENTS

| | | | |
|---|---|---|---|
| 4,986,608 A * | 1/1991 | Fett | B60B 27/0031 301/124.1 |
| 8,137,000 B2 * | 3/2012 | Stephan | B60B 27/001 301/105.1 |
| 2003/0111893 A1 * | 6/2003 | Hamperl | B60B 35/121 301/105.1 |
| 2012/0235463 A1 * | 9/2012 | Dejean | B60B 27/001 301/6.8 |

FOREIGN PATENT DOCUMENTS

DE   10 2008 018326 A1   10/2009
WO   2011/070387 A1   6/2011

* cited by examiner

DRIVEN WHEEL ASSEMBLY AND AUTOMOTIVE VEHICLE EQUIPPED WITH SUCH AN ASSEMBLY

BACKGROUND AND SUMMARY

The present invention relates to a driven wheel assembly. More particularly, the present invention relates to a driven wheel assembly comprising an axle spindle, a rotating drive shaft, a bearing, a hub, a brake disc and a wheel rim. The invention also concerns an automotive vehicle, such as a truck, equipped with such a driven wheel assembly.

Known driven wheel assemblies for vehicles, particularly large commercial vehicles, are provided with a drive shaft, a wheel rim and a brake disc coupled in rotation to a hub which rotates with respect to a fixed axle spindle via bearings.

It is known from WO-A-2011/070387 to fasten the drive shaft, the brake disc and the wheel rim to the hub by a single set of screws which axially pass through respective fastening flanges of the drive shaft, the brake disc and the wheel rim. This solution implies that a relatively high number of parts are fastened by the same screws in the same area.

In addition, in the case where some types of wheels, which are relatively large, are mounted on the vehicle, such a solution is difficult to implement because of the reduced space available for the braking system. To allow assembly of such wheels, the disc brake must often be provided with a tubular portion whose axial length makes it less resistant to torsion.

It is desirable to propose a new driven wheel assembly which improves the mounting of the brake disc.

An aspect of the invention relates to a driven wheel assembly comprising a fixed axle spindle, a rotating drive shaft extending inside the axle spindle, a bearing, a hub, a brake disc, a wheel rim, an inner ring of the bearing being mounted on the spindle, the hub being mounted on an outer ring of the bearing, the drive shaft, the brake disc and the wheel rim being coupled in rotation with the hub, the brake disc comprising a radial friction part and a tubular portion which is fastened to the hub. This driven wheel assembly is characterized in that the brake disc is fastened to the hub by radial fastening means extending along radial directions with respect to a rotation axis of the assembly and mounted through the tubular portion of the brake disc.

Thanks to an aspect of the invention, the tubular portion of the brake disc can have a reduced length, improving its resistance to torsion and allowing mounting of brake actuator in the case of wheels having a high width.

According to further aspects of the invention which are advantageous but not compulsory, such an assembly may incorporate one or several of the following features:

- The radial fastening means to fasten disc brake on the hub are located on the half length of the tubular part that is opposite to the friction part.
- The radial fastening means to fasten disc brake on the hub are located on an area extending, axially between the bearing and the axial end of the hub to which is at least coupled the drive shaft.
- The axial end of the tubular part opposite to the friction part is located between the bearing and the axial end of the hub and is located at distance from the axial end of the hub when measured in the direction of the rotation axis.
- The radial fastening means comprise radial screws extending in radial directions with respect to the rotation axis of the assembly and mounted through the tubular portion of the brake disc.
- The radial fastening means comprise radial pins inserted radially, with respect to the rotation axis X-X', in tubular portion and in hub.
- The radial pins are adjusted in first holes of the tubular portion of the brake disc and in second holes of the hub.
- The radial pins are hollow, preferably they have a tubular shape, and are passed through by the radial screws that fasten the radial pins on the hub.
- The hub and the tubular portion comprise friction elements adapted to increase friction between the huh and the brake disc.
- The friction elements comprise a second frustoconical surface of the tubular portion of the brake disc and a corresponding first frustoconical surface of the hub, both first and second frustoconical surfaces being in contact with each other and oriented towards the rotation axis of the assembly opposite from the friction pan, and wherein the friction elements also comprise means to urge the first and the second frustoconical surfaces against each other.
- The means to urge the first and second frustoconical surfaces against each other are formed by the radial screws which have a tapered head, and by a tapered surface of frustoconical holes of the tubular portion of the brake disc in which the radial screws are inserted.
- The means to urge the first and the second frustoconical surfaces against each other are formed by the radial pins which have tapered outer shapes in sliding contact with corresponding tapered surfaces of first hole in order to urge the first and second frustoconical surfaces against each other when the radial pins are inserted in the hub.
- The means to urge the first and second frustoconical surfaces against each other comprise wedges inserted in the tubular portion of the brake disc and in which the radial screws are inserted, and wherein a lateral surface of the wedges is inclined with respect to a longitudinal axis of the radial screws and converges towards the longitudinal axis of the radial screws opposite from a head of the radial screws, and wherein said lateral surface is in sliding, contact with a parallel surface of the tubular portion.
- Each wedge protrudes radially from the tubular portion towards the rotation axis and engages a corresponding hole or groove formed on the cylindrical outside surface of the hub.
- The width of the wheel rim is superior to 350 mm.
- The driven wheel assembly comprises splines, polygonal surfaces or keys to couple in rotation the brake disc to the hub.

The invention also concerns an automotive vehicle, in particular a truck, equipped with such a driven wheel assembly.

BRIEF DESCRIPTION OF THE DRAWINGS

The invention will now be explained in correspondence with the annexed figures and as an illustrative example. In the annexed figures.

DETAILED DESCRIPTION

Figure 1:
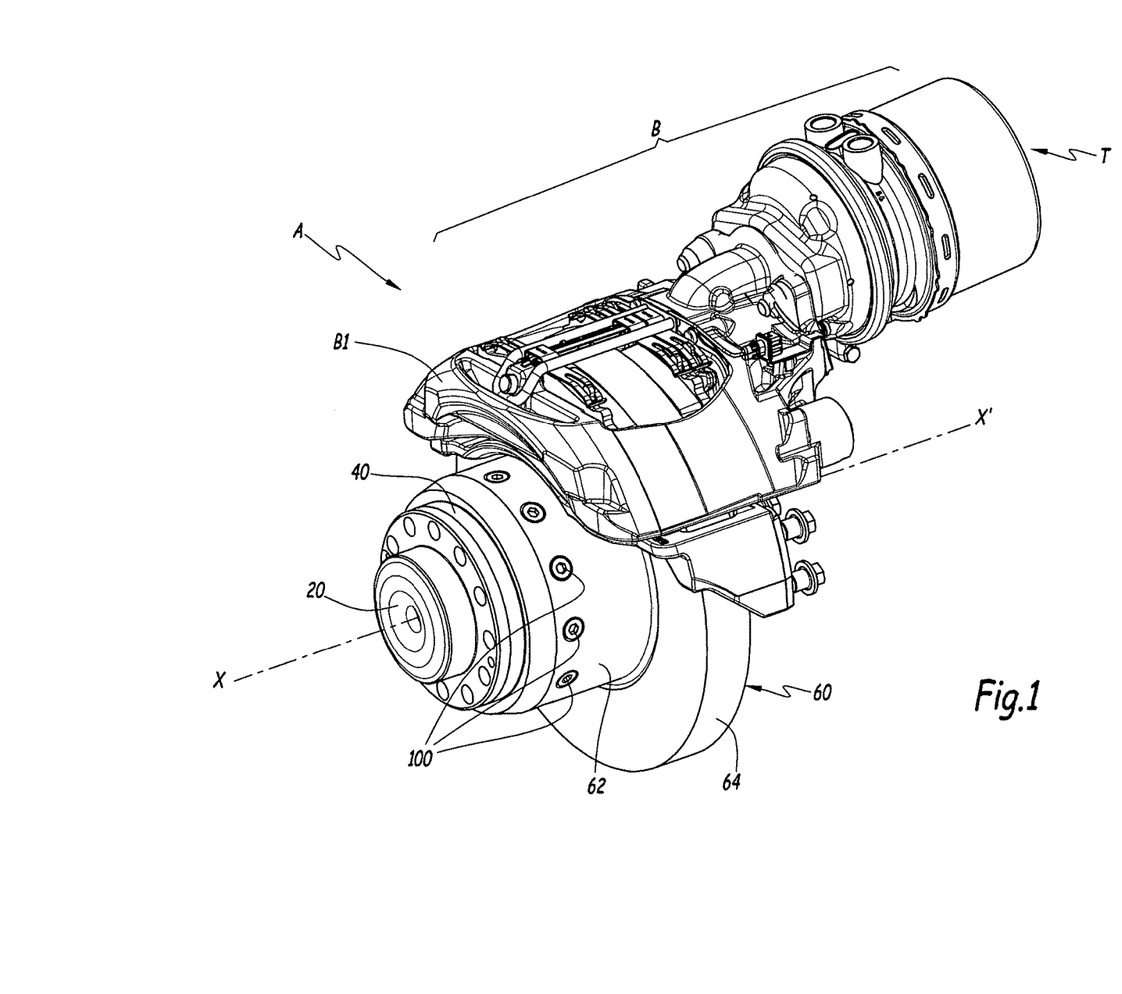
FIG. 1 is a perspective view of a driven wheel assembly according to a first embodiment of the invention.
Figure 2:
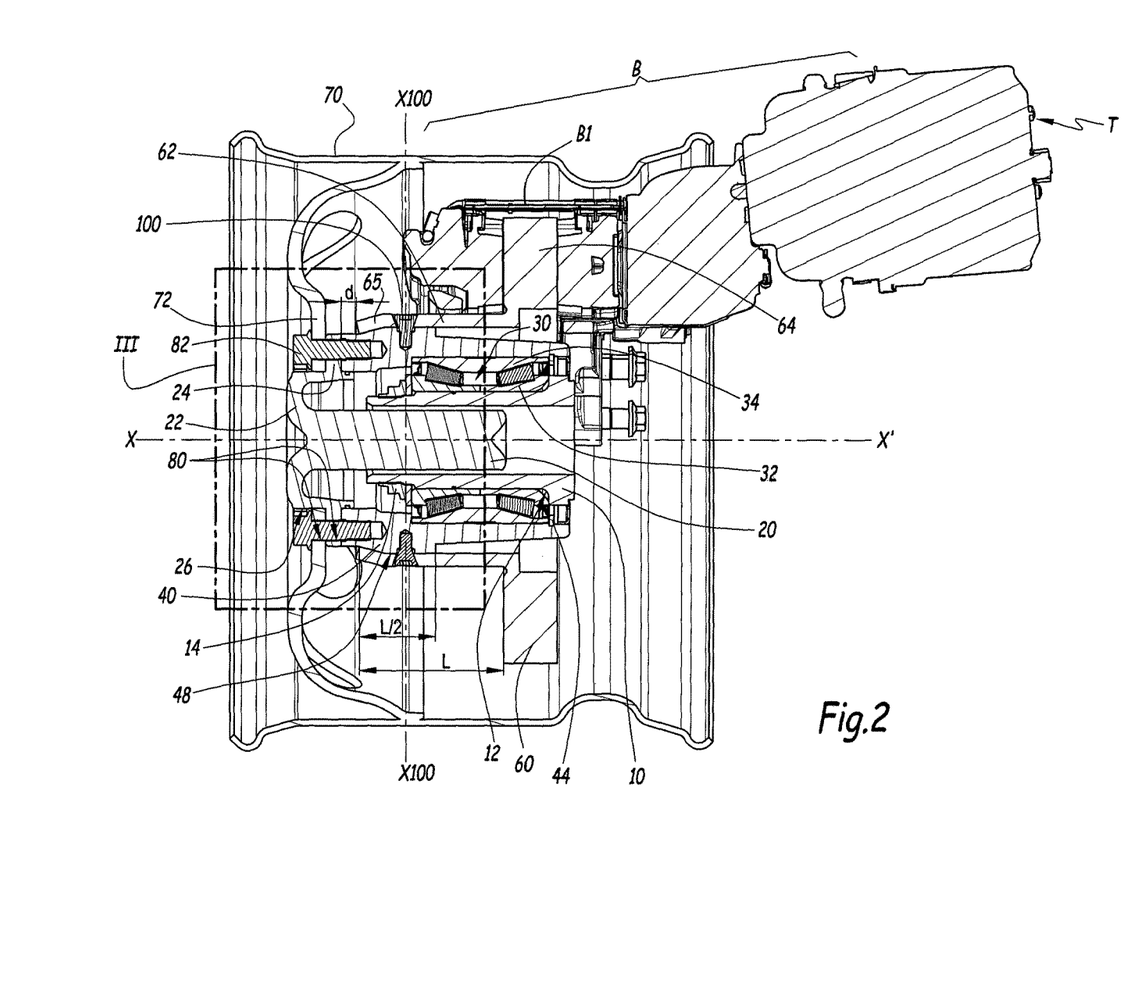
FIG. 2 a cross sectional view through the rotational axis of the driven wheel assembly of FIG. 1.

As illustrated on FIGS. 1 and 2, a driven wheel assembly A comprises an axle spindle 10, which is fixed with respect to a vehicle, such as a truck T, provided with the wheel assembly. Axle spindle 10 is partly shown on the figures and includes a tubular part extending along a longitudinal axis X-X'. Axle spindle 10 can be pan of an axle casing extending along the axis of the axle. Such a casing comprises a central differential housing and, on each side, at each of its extremities, an axle spindle.

Assembly A includes a drive shaft 20 extending inside axle spindle 10. Drive shall 20 rotates inside axle spindle 0 about the axis X-X'. The rotative motion of drive shaft 20 may be delivered by a driveline of the vehicle, especially by a differential contained in the central part of the axle easing, which is not shown on the figures. Only one end 22 of drive shaft 20 is shown on the figures, the other end being connected to a differential of the vehicle which is not represented. The end 22 defines the outward direction of the vehicle and the outer side of assembly A. The opposite of this direction defines the inner side of assembly A.

Assembly A also includes a bearing 30. Bearing 30 can be maintenance free and be may sealed so that no further addition of grease is required during the lifetime of the bearing. Bearing 30 is for example a double conical roller bearing. An inner ring 32 of bearing 30 is mounted on a shoulder 12 of the external surface of axle spindle 10. Inner ring 32 is therefore static. An outer ring 34 of bearing 30 is mounted radially inside a hub 40 provided with a tubular shaped body extending about axis X-X'. Outer ring 34 is mounted on a shoulder 42 of the internal surface of the hub 40. Outer ring 34 is fast in translation with hub 40 by an internal retaining ring 44. Inner ring 32 is secured in translation on spindle 10 through a nut 14 which is screwed on the end of spindle 10 and which lies against inner ring 32 via a washer. A sealing O-ring 55 may be provided in a corresponding annular groove in the cylindrical surface of the axle spindle shoulder 12, under the outward part of inner ring 32. Drive shaft 20 is provided, on its end 22, with a mounting flange 24. Flange 24 extends radially with respect to axis X-X' and departs from this axis. Mounting flange 24 is adapted to lie against a mounting surface 46 of the hub 40, perpendicular to axis X-X'. This mounting surface 46 is an annular surface and extends radially between the internal and external surfaces of hub 40. Mounting flange 24 may further comprise a tubular centring projection extending inwardly along axis X-X' and having, an external diameter equal to the inner diameter of hub 40. A sealing O-ring 53 may be provided in a groove formed on the external surface of said centring projection, for preventing any leak of oil at the hub/mounting flange interface.

Driven wheel assembly A also includes a brake disc 60. Brake disc 60 is provided with a tubular part 62 which extends along axis X-X' and with a friction part 64 which extends radially and externally from tubular part 62 and is engaged in a brake caliper B1 of the braking system B of the vehicle.

The assembly includes also a wheel rim 70 provided with a radially extending mounting flange 72. Flange 72 is adapted to lie against mounting flange 24. Wheel rim 70 is not shown on FIGS. 1 and 4 for the sake of clarity.

Drive shaft 20 is provided, on its end 22, with an external cylindrical surface 26 extending, along axis X-X'. This cylindrical surface 26 is delimited on one side by end 22 of drive shaft 20 and, on the other side, by mounting flange 24. Mounting flange 72 is adapted to lie around cylindrical surface 26 of the shaft 20.

Mounting flanges 24 and 72 are each provided with the same number of bores 80, which can be aligned with each other. Those bores 80 are drilled along several axes parallel to axis X-X'. Bores 80 are distributed regularly around the circumferences of the two flanges 24, 72. On FIGS. 2, 3, 5 and 6, only bores 80 located in the sectional plan of figures are visible. One bore 80 of each of the mounting flanges 24 and 72 aligned together forms a passageway through these two mounting flanges.

These bores 80 may be aligned with the same number of bores 47 drilled along the same axis X-X' as bores 80 in the hub 40 and perpendicularly to mounting surface 46. These bores 47 are provided with threads in which screws 82 can be screwed. These screws 82 are mounted through mounting flanges 24 and 72. These screws 82 fasten the assembly by pressing the wheel rim 70 and the drive shaft 20 against the hub 40.

Additional bores and screws may be provided to fasten the drive shaft 20 with the hub 40 when only wheel rim 70 needs to be dismounted.

The hub 40 comprises an outer cylindrical surface 48 against which tubular portion 62 is mounted.

Figure 3:
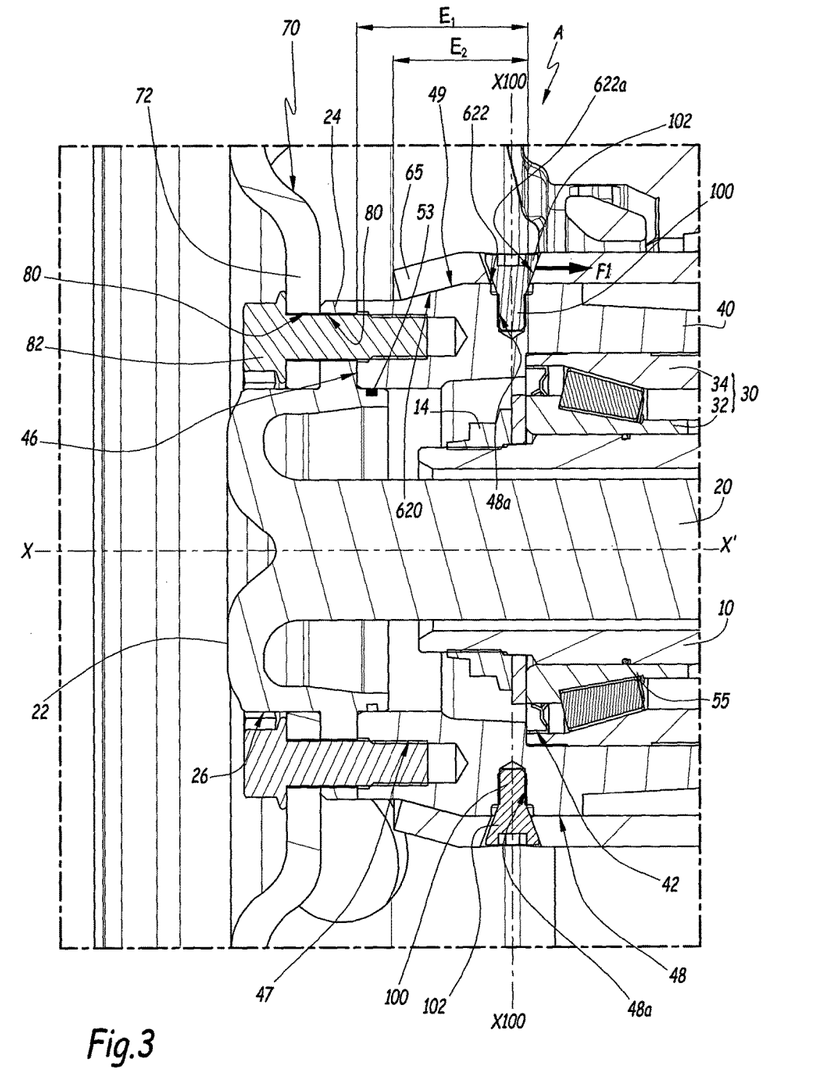
FIG. 3 is a cross sectional view at a larger scale of detail III on FIG. 2.

Brake disc 60 is fastened to hub 40 by several radial fastening means extending along radial directions X100 with respect to axis X-X'. Radial fastening means are, for instance and such as represented on FIGS. 1 to 4, on the upper part of FIG. 5 and on FIG. 6, radial screws 100. Radial screws 100 are inserted through tubular portion 62 and screwed into threaded bores 48a of cylindrical surface 4 are aligned with directions X100. Radial screws 100 have preferably a tapered head 102 which is inserted in corresponding tapered holes 622 of the tubular portion 62 (FIGS. 2 and 3).

Radial screws 100 permit to fasten the brake disc 60 to the hub 40 independently from the fastening of drive shaft 20 and wheel rim 70 to hub 40 with screws 82. This permits to reduce the axial length of tubular portion 62 and to improve the mechanical resistance of brake disc 60 to torsion stresses.

The number of radial screws 100 is advantageously comprised between six and twelve.

Advantageously, the radial fastening means, for instance radial screws 100, to fasten disc brake 60 on the hub 40 are located on the half-length L/2 of the tubular part 62 that is opposite to the friction part 64.

Preferably, the radial fastening means 100 are located in an area E1 extending axially between bearing 30 and mounting surface 46 of the hub 40. In other words, the radial fastening means 00 to fasten disc brake 60 on the hub 40 are located on an area E1 extending axially between the bearing 30 and the axial end 46 of the hub 40 to which are coupled the drive shaft 20 and the wheel rim 70.

More specifically, the radial fastening means 100 are located in an area E2 extending axially between bearing 30 and the axial end 65 of the tubular part 62 opposite to friction part 64 and the axial end 65 is preferably at distance d from the axial end 46 of the huh 40 when measured in the axial direction X-X'.

Such a location of the radial fastening means 100 is preferred to avoid an excessive heating of the bearing 30 and, in particular, of the grease of the bearing 30 that could reduce lifetime of the grease and also lifetime of the bearing itself. Indeed, radial fastening means and especially radial screws 100 form a thermal bridge between the brake disc 60 and the hub 40 so that when the friction part 64 is heated during a braking phase of the vehicle, the tubular part 62 can transmit via radial fastening means 100 heat to the hub 40 and then to the outer ring 34 of the bearing 30 that is in contact with the hub 40. Thanks to a specific location of the radial fastening means 100 according to the invention, radial fastening means 100 are located at distance from the bearing 30 allowing a reduction of the heat that can be transmit from the brake disc 40 to the bearing 30.

To reduce the shear strain exerted on screws 100 by the torque transmission between hub 40 and brake disc 60 during rotation of assembly A because of the radial positioning of screws 100, hub 40 and brake disc 60 may comprise respective friction elements which intend to increase friction between hub 40 and brake disc 60. Such a friction permits to transmit a certain amount of torque between hub 40 and brake disc 60.

To this end and in a first embodiment of the invention represented on FIGS. 1 to 3, hub 40 may comprise a first frustoconical surface 49 which extends from cylindrical surface 48 towards wheel rim 70. On its axial end 65 opposed to friction part 64, tubular portion 62 may be provided with a second frustoconical surface 620 which converges towards axis X-X' opposite from friction part 64. The first frustoconical surface 49 has a corresponding shape with the second frustoconical surface 620. The second frustoconical surface 620 is mounted against the first frustoconical surface 49.

The friction elements also comprise means to urge surfaces 620 and 49 against each other in order to generate friction between surfaces 620 and 49. According to the first embodiment of the invention represented on FIGS. 1 to 3, the means to urge surfaces 620 and 49 against each other can be realized by tapered surfaces of the heads 102 of screws 100 and corresponding tapered surfaces 622a of holes 622. As represented on FIG. 3, tapered surfaces of holes 622 are realised so that, when screws 100 are screwed in bores 48a, heads 102 are in contact with tapered surfaces 622a of holes 622 opposed to the second frustoconical surface 620. This contact induces, under action of heads 102, a force. F1 which tends to move brake disc 60 along axis X-X' towards its inward end. Thus, the contact between second 620 and first 49 frustoconical surfaces and the force F1 produce a friction between brake disc 60 and hub 40 which reduces the shear strain in radial screws 100.

The invention is particularly useful in the case of wheels of a large size, for example a wheel having a width measured in the axial direction X-X' that is superior to 350 mm, are mounted on the vehicle. Because of the small amount of space available to insert the braking system inside the wheel rim 70, the length, along axis X-X', of tubular portion 62 must be increased so that friction part 64 can be inserted in the caliper. If tubular portion 62 is too long, its resistance to torsion can be weak. The invention permits to solve this issue by reducing the length of tubular portion 62 thanks to the fact that tubular portion 62 is not fastened to hub 40 by a flange screwed axially against mounting surface 46 on the outer side of assembly A.

Figure 4:
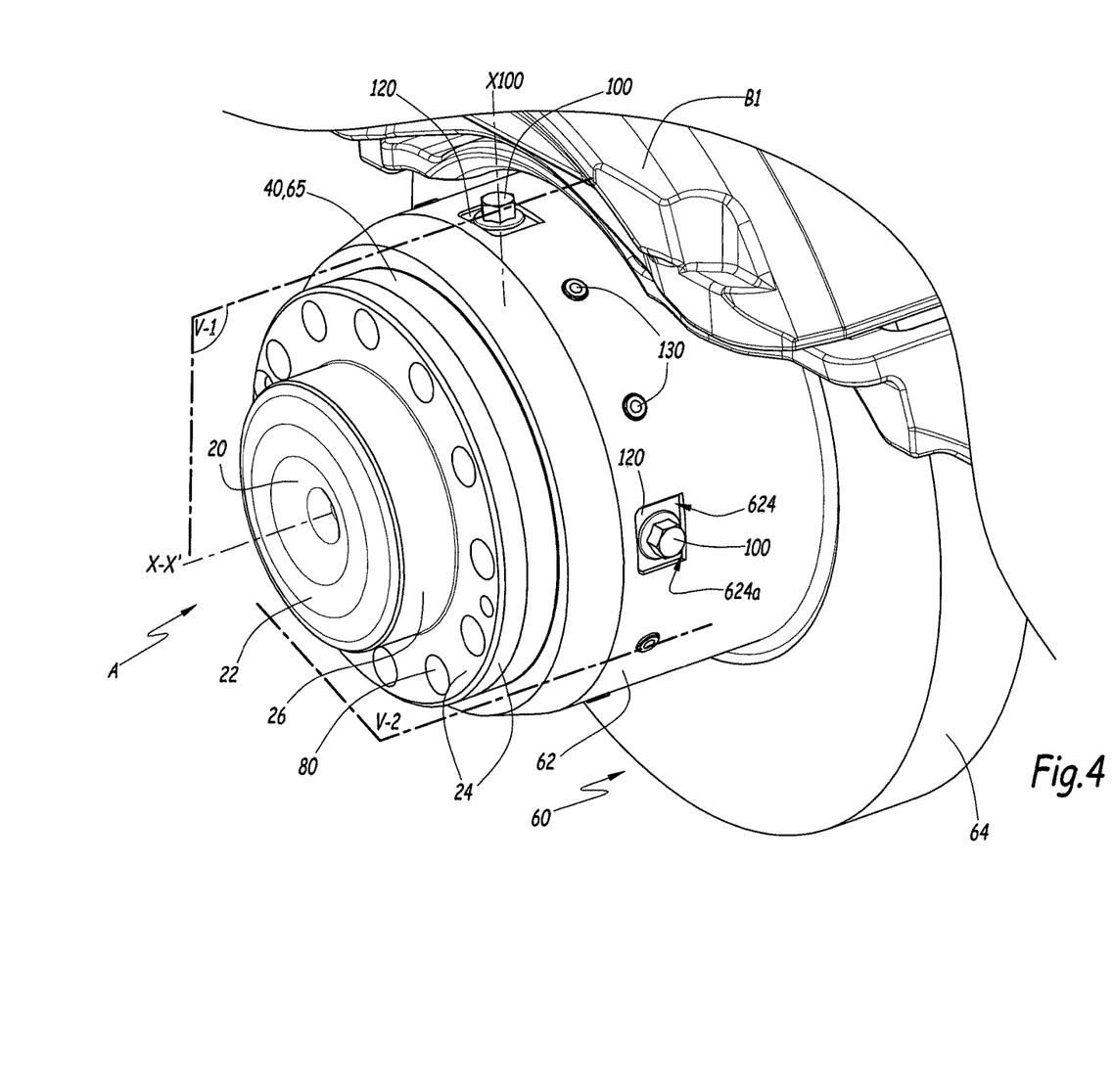
FIG. 4 is a view similar to FIG. 1, for a driven wheel assembly according to a second embodiment of the invention.
Figure 5:
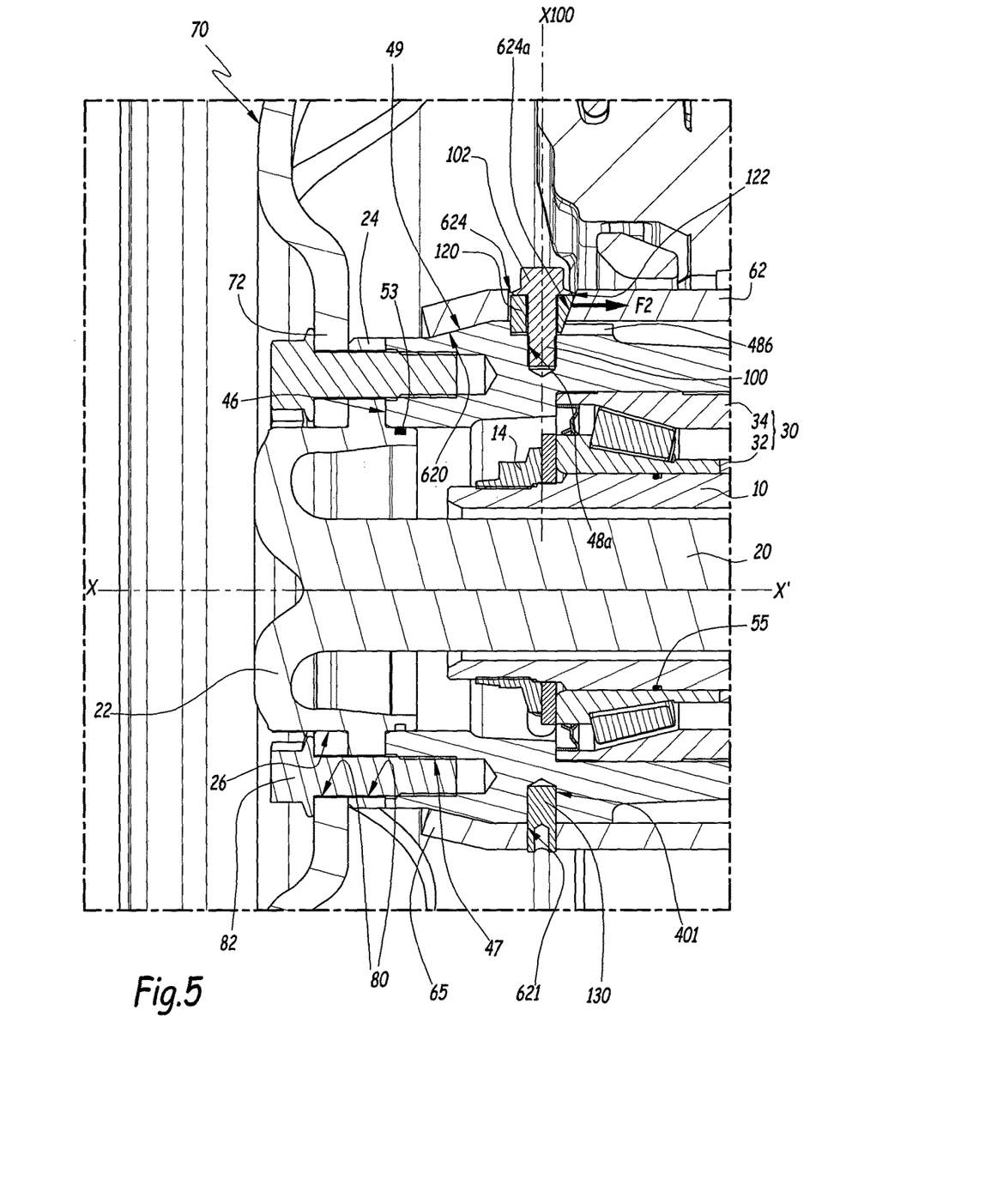
FIG. 5 is a cross sectional view, along plane V-1 in the upper part of the figure, and along plane V-2 in the lower part of the figure, of the driven wheel assembly of FIG. 4.
Figure 6:
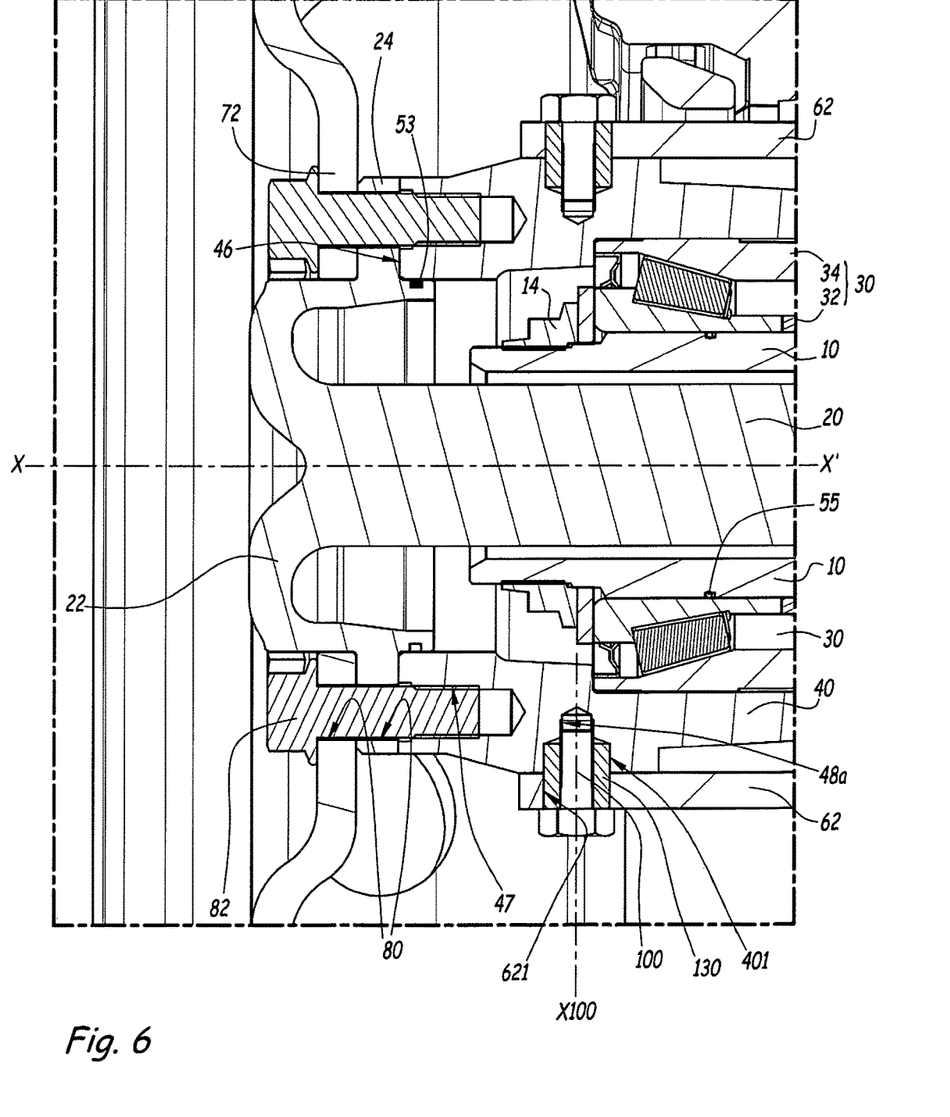
FIG. 6 is a cross sectional view according to a third embodiment of the invention.

A second embodiment of the invention is represented on FIGS. 4 and 5. In this embodiment, elements similar to the first embodiment have the same references and work in the same way. Only the differences with respect to the first embodiment are detailed hereafter.

In this second embodiment, assembly A comprises wedges 120 inserted in tubular portion 62 and in which radial screws 100 are inserted along axis X100. Each wedge 120 comprises a lateral surface 122 oriented towards the inner side of assembly A. Lateral surface 122 is inclined with respect to axis X100 and converges towards this axis opposite from head 102 of each screw 100.

Wedges 120 are inserted in holes 624 of tubular portion 62, which have, for instance, a substantially square shape. Holes 624 have an inner surface 624a which faces lateral surface 122 and is parallel to lateral surface 122. Lateral surface 122 and inner surface 624a are in sliding contact when screws 100 are screwed in bores 48a.

The cooperation between surfaces 122 and 624a forms the means to urge surfaces 49 and 620 against each other and generates a force F2 exerted on tubular portion 62 and oriented, along axis X-X' towards the inner side of assembly A. Force F2 tends to move brake disc 60 towards the inner side of assembly A and generates friction between first 49 and second 620 frustoconical surfaces.

Preferably, when radial screws 100 are screwed into the hub 40, each wedge 120 is slid up to a groove 486 of the hub 40. To be more precise, each wedge 120 is slid until engaging a groove 486 that is formed on the outside cylindrical surface 48 of the hub 40 and that extends, for instance, along the axial direction X-X'. Each groove is formed around a respective bore 48a. Thanks to this arrangement and during braking phases, the wedges 120 transmit the braking torque from the brake disc 60 to the hub 40. The cooperation of the wedges 120 with corresponding grooves 486 allows a reduction of shear stress generated on the screws 100 when braking torque is applied on the brake disc 60.

As represented on FIG. 4, assembly A may comprise four screws 100 inserted in corresponding wedges 120 distributed around the circumference of brake disc 60.

According to a non-shown embodiment, assembly A may comprise a different number of screws 100 inserted in wedges 120.

According to an optional aspect of the invention represented only on FIGS. 4 and 5, radial fastening means may comprise several radial pins 130 inserted radially with respect to axis X-X' in tubular portion 62 and in hub 40. More precisely, radial pins 130 are adjusted in first holes 621 of the tubular portion 62 and in second holes 401 of the hub 40. Radial pins 130 are able to transmit braking torque between brake disc 60 and hub 40 and can be used together with or without the coupling between first 49 and second 620 frustoconical surfaces.

When pins 100 are used in conjunction with the coupling realized by first 49 and second 620 frustoconical surfaces, the radial pins 130 may have tapered shapes 131 (not-shown) which are in sliding contact with corresponding tapered surfaces of first holes 621 of the tubular portion 62 in order to urge the first 49 and second 620 frustoconical surfaces against each other when the radial pins 130 are inserted in the hub 40.

Pins can also be used in replacement of or in addition to radial screws 100. In the latter option, when they are used in addition to the radial screws 100, the radial pins 130 permit to reduce the shear strain sustained by screws 100 by transmitting braking torque from the brake disc 60 to hub 40.

Besides, radial pins 130 can be used in close cooperation with radial screws 100. For instance, in a third embodiment represented on FIG. 6, radial pins 130 are hollow, for instance of tubular shape, and are passed through by the radial screws 100. When screwed in threaded bores 48*a*, the radial screws 100 fasten the radial pins 130 on the hub 40.

According, to another non-shown embodiment of the invention, assembly A may comprise splines, polygonal surfaces or keys to couple in rotation brake disc 60 to hub 40 in order to reduce the shear strain sustained by radial screws 100.

The technical features of the previously described embodiments can be combined within the scope of the invention.

The invention is applicable with trucks, buses, cars and any other automotive vehicle.

The invention claimed is:

1. Driven wheel assembly comprising:
a fixed axle spindle,
a rotating drive shaft extending inside the axle spindle,
a bearing,
a hub,
a brake disc,
a wheel rim,
an inner ring of the bearing being mounted on the spindle, the hub being mounted on an outer ring of the bearing, the drive shaft, the brake disc and the wheel rim being coupled in rotation with the hub, the brake disc comprising a radial friction part and a tubular portion which is fastened to the hub, wherein the brake disc is fastened to the hub by radial fastening means extending along radial directions with respect to a rotation axis of the assembly and mounted through the tubular portion of the brake disc, wherein the radial fastening means to fasten the disc brake on the hub are located on an area extending axially between the bearing and the axial end of the hub to which is at least coupled the drive shaft.

2. Driven wheel assembly according to claim 1, wherein the radial fastening means to fasten disc brake on the hub are located on the half length of the tubular part that is opposite to the friction part.

3. Driven wheel assembly according to claim 1, wherein the axial end of the tubular part opposite to the friction part is located between the bearing and the axial end of the hub and is located at distance from the axial end of the hub when measured in the direction of the rotation axis.

4. Driven assembly according to claim 1, wherein radial fastening means comprise radial screws extending in radial directions with respect to the rotation axis of the assembly.

5. Driven wheel assembly according to claim 4, wherein radial fastening means comprise radial pins inserted radially, with respect to the rotation axis, in tubular portion and in hub, wherein radial pins are hollow and are passed through by the radial screws that fasten the radial pins on the hub.

6. Driven wheel assembly according to claim 5, wherein the hub and the tubular portion comprise friction elements adapted to increase friction between the hub and the brake disc, wherein the friction elements comprise a second frustoconical surface of the tubular portion of the brake disc and a corresponding first frustoconical surface of the hub, both first and second frustoconical surfaces being in contact with each other and oriented towards the rotation axis of the assembly opposite from the friction part, and wherein the friction elements also comprise means to urge the first and the second frustoconical surfaces against each other, wherein the means to urge the first and second frustoconical surfaces against each other are formed by the radial pins which have tapered outer shapes in sliding contact with corresponding tapered surfaces of first holes of the tubular portion in order to urge the first and second frustoconical surfaces against each other when the radial pins are inserted in the hub.

7. Driven wheel assembly according to claim 4, wherein the hub and the tubular portion comprise friction elements adapted to increase friction between the hub and the brake disc, wherein the friction elements comprise a second frustoconical surface of the tubular portion of the brake disc and a corresponding first frustoconical surface of the hub, both first and second frustoconical surfaces being in contact with each other and oriented towards the rotation axis of the assembly opposite from the friction part, and wherein the friction elements also comprise means to urge the first and the second frustoconical surfaces against each other, wherein the means to urge the first and the second frustoconical surfaces against each other are formed by the radial screws which have a tapered head, and by a tapered surface of the frustoconical holes of the tubular portion of the brake disc in which the radial screws are inserted.

8. Driven wheel assembly according to claim 4, wherein the hub and the tubular portion comprise friction elements adapted to increase friction between the hub and the brake disc, wherein the friction elements comprise a second frustoconical surface of the tubular portion of the brake disc and a corresponding first frustoconical surface of the hub, both first and second frustoconical surfaces being in contact with each other and oriented towards the rotation axis of the assembly opposite from the friction part, and wherein the friction elements also comprise means to urge the first and the second frustoconical surfaces against each other, wherein the means to urge the first and second frustoconical surfaces against each other comprise wedges inserted in the tubular portion of the brake disc and in which the radial screws are inserted, and wherein a lateral surface of the wedges is inclined with respect to a longitudinal axis of the radial screws and converges towards the longitudinal axis of the radial screws opposite from a head of the radial screws, and wherein said lateral surface is in sliding contact with a parallel surface of the tubular portion.

9. Driven wheel assembly according to claim 8, wherein each wedge protrudes radially from the tubular portion towards the rotation axis and engages a corresponding hole or groove formed on the cylindrical outside surface of the hub.

10. Driven wheel assembly according to claim 1, wherein radial fastening means comprise radial pins inserted radially, with respect to the rotation axis, in tubular portion and in hub.

11. Driven wheel assembly according to claim 10, wherein radial pins are adjusted in first holes of the tubular portion of the brake disc and in second holes of the hub.

12. Driven wheel assembly according to claim 1, wherein the hub and the tubular portion comprise friction elements adapted to increase friction between the hub and the brake disc.

13. Driven wheel assembly according to claim 12, wherein the friction elements comprise a second frustoconical surface of the tubular portion of the brake disc and a corresponding first frustoconical surface of the hub, both first and second frustoconical surfaces being in contact with each other and oriented towards the rotation axis of the assembly opposite from the friction part, and wherein the friction elements also comprise means to urge the first and the second frustoconical surfaces against each other.

14. Driven wheel assembly according to claim 1, wherein it comprises splines, polygonal surfaces or keys to couple in rotation the brake disc to the hub.

15. Automotive vehicle equipped with a driven wheel assembly according to claim 1.

16. Driven wheel assembly comprising:
a fixed axle spindle,
a rotating drive shaft extending inside the axle spindle,
a bearing,
a hub,
a brake disc,
a wheel rim,
an inner ring of the bearing being mounted on the spindle, the hub being mounted on an outer ring of the bearing, the drive shaft, the brake disc and the wheel rim being coupled in rotation with the hub, the brake disc comprising a radial friction part and a tubular portion which is fastened to the hub, wherein the brake disc is fastened to the hub by radial fastening means extending along radial directions with respect to a rotation axis of the assembly and mounted through the tubular portion of the brake disc, wherein the width of the wheel rim is superior to 350 mm.

* * * * *